US007003044B2

(12) United States Patent
Subramanian et al.

(10) Patent No.: US 7,003,044 B2
(45) Date of Patent: Feb. 21, 2006

(54) METHOD FOR ALLOCATING BITS AND POWER IN MULTI-CARRIER COMMUNICATION SYSTEM

(75) Inventors: Chandrasekarapuram A. Subramanian, Bangalore (IN); Debasish Pramanik, Bangalore (IN)

(73) Assignee: Sasken Communication Technologies Ltd., Bangalore (IN)

( * ) Notice: Subject to any disclaimer, the term of this patent is extended or adjusted under 35 U.S.C. 154(b) by 766 days.

(21) Appl. No.: 09/775,183

(22) Filed: Feb. 1, 2001

(65) Prior Publication Data

US 2001/0031014 A1    Oct. 18, 2001

Related U.S. Application Data

(60) Provisional application No. 60/179,539, filed on Feb. 1, 2000.

(51) Int. Cl.
*H04K 1/10* (2006.01)
*H04L 27/28* (2006.01)

(52) U.S. Cl. .................................................. 375/260
(58) Field of Classification Search ................ 375/222, 375/260, 261; 455/59, 60; 370/206, 207, 370/343, 344, 464, 480
See application file for complete search history.

(56) References Cited

U.S. PATENT DOCUMENTS

| | | | | | |
|---|---|---|---|---|---|
| 5,479,447 A | * | 12/1995 | Chow et al. | ................ | 375/260 |
| 6,005,893 A | * | 12/1999 | Hyll | ........................... | 375/260 |
| 6,144,696 A | * | 11/2000 | Shively et al. | .............. | 375/222 |
| 6,259,746 B1 | * | 7/2001 | Levin et al. | ................ | 375/295 |
| 6,732,281 B1 | * | 5/2004 | Mantri et al. | ............... | 370/464 |

* cited by examiner

*Primary Examiner*—Betsy L. Deppe
(74) *Attorney, Agent, or Firm*—Welsh & Katz, Ltd.

(57) ABSTRACT

A method of transmitting a data bit stream on a multi-carrier transmission system is provided. The steps include estimating a signal to noise ratio for each carrier for a known transmit power for each carrier, allocating a quantity of bits for each carrier within limits imposed by a target bit error rate and the estimated signal to noise ratio, computing a total excess power available for a current allocation of bits, computing additional power that would be required by each carrier to carry additional bits, and allocating the total excess power based on the computation of additional power required by each carrier to carry additional bits. The computation of additional power needed may be performed by computing the additional gain necessary to carry additional bits or by computing the additional excess power necessary to carry additional bits.

39 Claims, 5 Drawing Sheets

Fig. 2

| Tone | 1 | 2 | 3 | 4 | 5 | 6 | 7 | 8 | 9 | 10 | 11 |
|------|---|---|---|---|---|---|---|---|---|----|----|
| BRM | 0 | 1(0000) | 0 | 1(0001) | 1(0000) | 1(0001) | 1(0010) | 0 | 0 | 1(0000) | 1(0010) |

Fig 3.

| Tone | 1 | 2 | 3 | 4 | 5 | 6 | 7 | 8 | 9 | 10 | 11 |
|------|---|---|---|---|---|---|---|---|---|----|----|
| BRM | 0 | 1(0) | 0 | 1(1) | 1(00) | 1(01) | 1(10) | 0 | 0 | 1(00) | 1(10) |

Fig 4.

| Tone | 1 | 2 | 3 | 4 | 5 | 6 | 7 | 8 | 9 | 10 | 11 |
|------|---|---|---|---|---|---|---|---|---|----|----|
| BRM | 0 | 1 (0101) | 0 | 1 (0110) | 1 (1010) | 0 | 1 (1011) | 0 | 0 | 0 | 0 |

METHOD FOR ALLOCATING BITS AND POWER IN MULTI-CARRIER COMMUNICATION SYSTEM

This application claims the benefit of U.S. Provisional Application No. 60/179,539, filed Feb. 1, 2000.

BACKGROUND OF THE INVENTION

1. Field of the Invention

This invention pertains to high speed data transmission systems using multiple carriers and more particularly to the art of distributing the power and bits across various carriers so as to maximize the net data rate.

2. Related Art

A multi-carrier transmission system is one that employs more than one carrier for transmission of data using Frequency Division Multiplexing (FDM). Generally, to transmit a given bit stream over a multi-carrier transmission system, the bit stream is converted into parallel data. In a Quadrature Amplitude Modulation system, the parallel data may be used to choose a constellation point (a QAM symbol). These constellation points may be scaled by the fraction of the power they are allocated. The scaled constellation points are then modulated, i.e., converted from frequency to time domain signal and are transmitted over a channel such as a telephone line. The bit rate (number of bits allocated to each carrier) and the fraction of total power allocated to each carrier are variables in such a system. The number of bits per carrier determines the size of the constellation for that carrier. The fractional power is the portion of total power for all carriers which is allocated to any given carrier.

A receiver in a multi-carrier system demodulates the received signal to decode the transmitted constellation point. A constellation decoder on the receiver side converts these constellation points into bits, and the bits of all of the carriers are converted into a single bit stream.

The channel may impair the transmitted signal and the bits received on each sub channel may be in error. The bit error rate for a given carrier depends on the ratio of signal power to noise power, which is known as the Signal to Noise Ratio (SNR) for the carrier and the size of the constellation on that carrier. It is known that the aggregate bit rate is maximized when the parameters of bits per carrier and fraction of the power allocated to each carrier are appropriately chosen. In particular, the bit error rate on each of the carriers should be the same for the bit rate to be maximum given a target bit error rate. See, for example, John Bingham, "Multicarrier Modulation for Data Transmission: An Idea Whose Time Has Come," IEEE Communications Magazine May 1990.

In general, it may not be possible to get a bit allocation at nominal power that will ensure that all carriers operate at the same bit error rate. One way of achieving uniform bit error rate across all carriers is to boost or buck the signal power, i.e., in effect increase or decrease the SNR and control the bits allocated in each carrier. See, for example, "Method For Improving Modem Performance By Controlling Transmitted Power Of Modem And Modem Implementing The Same," U.S. Pat. No. 5,265,151.

For each of the carriers, if the SNR is known to the receiver, then the receiver can determine, with an appropriate algorithm, parameters such as bits per carrier and the fraction of the power allocated to that carrier. These parameters can then be communicated to the transmitter using a suitable messaging scheme. These parameters are chosen subject to constraints on maximum power per carrier, minimum power per carrier and the total power. It is therefore necessary for the receiver to estimate the signal to noise ratio before it can decide on the bit and power allocation. The transmitter during the initial phase of establishing connection sends known bits (known constellation points) so that the receiver can estimate the signal to noise ratio. Using the signal to noise ratio as computed from the known constellation points, the receiver decides on the bit and power allocation to each carrier.

One solution to the allocation problem is to compute all feasible allocations and choose the best allocation scheme. Though such a solution works in theory, it is not suitable from an implementation point of view. This is due to the fact that the number of feasible solutions are exponential in the number of carriers and the number of steps in bit allocation per carrier possible without violating power constraints. Several sub optimal algorithms are known. See, for example, Peter S. Chow, John M. Cioffi and John A. C. Bingham, "A Practical Discrete Multitone Transceiver Loading Algorithm for Data Transmission Over Spectrally Shaped Channels", IEEE Transactions on Communications Vol. 43 1995; R. H. Fischer and J. B. Huber, "A New Loading Algorithm for Discrete Multitone Transmission", IEEE Globecom, 1996. These algorithms are also complex from an implementation point of view.

Also, the SNR obtained on a carrier may not be sufficient for carrying even the smallest bit rate constellation ($2^{Bmin}$ point constellation) at the target bit error rate. One possible solution would be to increase the transmission power on that carrier and thus increase the SNR. However, increasing transmission power may not be always possible due to constraints on total power and the maximum power allowed per carrier. In such cases, one way to use that carrier for data transmission is to add redundancy to reduce the bit error rate. Fractional bit transmission is one such method of adding redundancy to increase data rate given a target bit error rate.

In fractional bit transmission, sets of carriers that individually cannot carry one or more bits are collectively used for data transmission. All carriers in a set carry the same QAM symbol. In effect each carrier carries a fraction of a symbol, hence the name fractional bit allocation. The objective being to maximize the data rate at a given target bit error rate, smaller the n higher the data rate/per carrier and lesser is the power per bit. A drawback of fractional bit transmission is an excessive Peak to Average Ratio (PAR).

The bit and power allocation are decided by the receiver and are communicated to the transmitter. The protocol for communicating integral bit allocations is simple. As an example, the protocol indicates the number of bits and relative boost or reduction in power for each carrier. See, ANSI T1.413-1995, American National Standard for Telecommunications—Network and Customer Installation Interfaces—Asymmetric Digital Subscriber Line (ADSL) Metallic Interface, August 1995. The message conveying fractional bit allocation should convey the fractional allocation on each carrier and also indicate the carriers that carry the same symbol. This allocation message must be as small as possible to reduce overhead.

One protocol known for conveying fractional allocation is as follows: For each carrier carrying fractional bit, the offset of the nearest carrier that carries the same bit is indicated. A bit field (say m bits) is allocated for conveying the nearest carrier index. This protocol has the following limitations. First, two carriers separated by distance greater the $2^m-1$ cannot carry the same symbol. Second, the message length is directly proportional to the allowable index difference between the carriers that carry the same bit. See Yuri Goldstein, "Parallel Transmission to Increase Reliable Data Rate in a DMT-based System", ITU-T Standardization sector SG-15, NG-039, August 1999.

Accordingly, there is a need for a FDM transmission system capable of the fractional bit allocation that is able to control the maximum number of carriers carrying the same symbol. Furthermore, the fractional bit allocation should be able to control the number of symbols that are transmitted using fractional bit allocation. These features are desirable from the point of view of controlling the Peak-to-Average Ratio (PAR) of the signal.

In fractional bit transmission, the same symbol is sent on more than one carrier. This increases the PAR of the signal. A methods for mitigating the increase in the PAR of the signal is also needed.

SUMMARY

A method of transmitting a data bit stream on a multi-carrier transmission system is provided. The steps include estimating a signal to noise ratio for each carrier for a known transmit power for each carrier, allocating a quantity of bits for each carrier within limits imposed by a target bit error rate and the estimated signal to noise ratio, computing a total excess power available for a current allocation of bits, computing additional power that would be required by each carrier to carry additional bits, and allocating the total excess power based on the computation of additional power required by each carrier to carry additional bits. The computation of additional power needed may be performed by computing the additional gain necessary to carry additional bits or by computing the additional excess power necessary to carry additional bits. Additional steps for transmitting the data stream include converting the data bit stream into a plurality of parallel bit streams based on the allocation of the total excess power, encoding the parallel bit streams, scaling the encoded parallel bit streams based on the allocation of the total excess power; and modulating the encoded and scaled parallel bit streams for transmission. In allocating excess power, priority may be given to the carriers requiring the least additional gain or excess power by, for example, sorting the carriers from least to greatest computed gain or excess power required to carry additional bits. The steps of computing total excess power; computing gains and excess power required by each carrier to carry additional bits, and allocating the total excess power may be repeated as necessary.

Computing the total excess power may involve computing a signal to noise ratio required for achieving the target bit error rate for a current bit allocation, calculating a reduced transmit power to achieve the computed signal to noise ratio, calculating an excess power for each carrier based on the nominal power and the calculated reduced transmit power, and summing the excess power for all carriers carrying data bits.

The method may further include reallocating one or more bits from a first carrier having a quantity of bits greater than zero to a second carrier having an initial allocation of zero bits. The method may further include allocating fractional bits to a set of carriers out of the plurality of carriers having the smallest cardinality and/or the lesser power requirement.

A system for performing the method is also provided. A transmitter portion of the system includes a serial to parallel converter connected to a quadrature amplitude encoder, which is connected to scalers that adjust the gain of the encoded signal, a means for allocating the bit rate for each of the parallel data streams and for allocating power for the means for scaling, and a modulator. A channel connects the transmitter portion of the system to a receiver portion of the system. The receiver portion includes a demodulator connected to the channel, inverse scalers to account for the gain applied by the scalers, a quadrature amplitude decoder, and a parallel to serial converter.

A method of conveying fractional bit allocation from a receiver to a transmitter coupled by a plurality of carriers is also provided. The method includes allocating fractional bits across a set of carriers of the plurality of carriers, identifying all carriers in the set of carriers with a predetermined bit pattern, and applying a pseudo-random phase offset to the carriers identified with the predetermined bit pattern. The pseudo-random phase offset may be applied in multiples of 45 degrees.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessary to scale, emphasis instead being placed upon illustrating the principles of the invention. Moreover, in the figures, like reference numerals designate corresponding parts throughout the different views.

DETAILED DESCRIPTION

Figure 1:
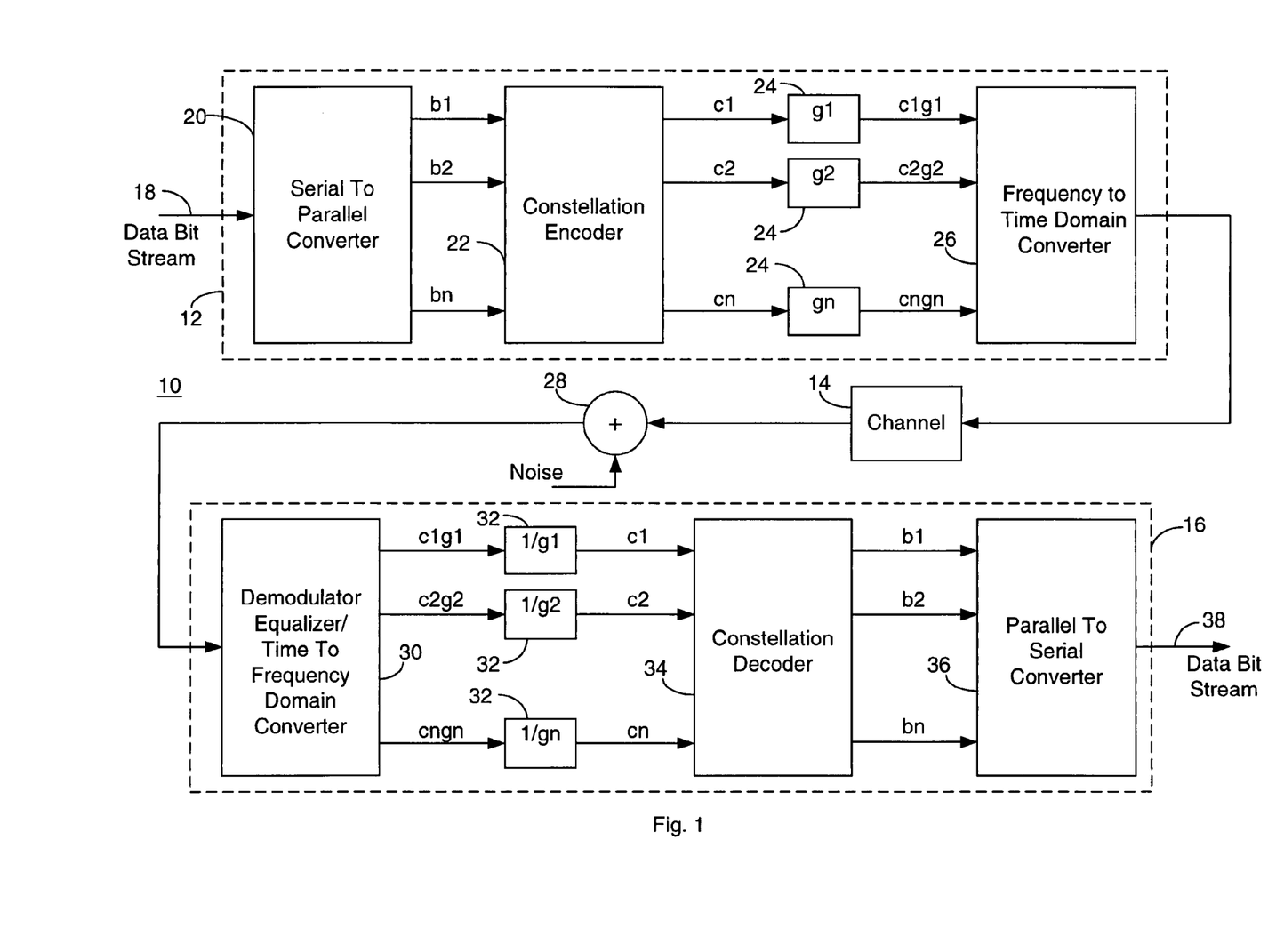
FIG. 1 is a block diagram of one example of a multi-carrier transmission system which may be used to implement the present invention.

A multi-carrier transmission system is one that employs several carriers for transmission of data using Frequency Division Multiplexing (FDM). FIG. 1 is a block diagram of a FDM system 10 having a transmitter 12 a channel 14 and a receiver 16. Data is input to the system in the form of a bit stream 18. A serial to parallel converter 20 converts the bit stream into parallel data depending on the bit rate on each carrier (e.g. b1 bits on carrier 1, b2 bits on carrier 2, . . . bn bits on carrier n). The parallel data streams may have differing bit rates. The bits allocated to each carrier are used to choose a constellation point (a QAM symbol) by a constellation encoder 22. The constellation encoder 22 is connected to a plurality of scalers 24, each of whose magnitude scales the corresponding carrier by the fraction of the power allocated to it. The scaling may involve complex gains. The scaled constellation points are modulated in a frequency to time domain converter 26 (e.g. using IFFT) and are transmitted over the channel 14. The frequency to time domain converter 26 may include cyclic prefix/zero suffix processing. The channel 14 may be a telephone line, for example. There may be noise 28 associated with the channel 14.

The number of bits allocated to each carrier (b1, b2 . . . bn) i.e. bit rate on each carrier and the fractions of total power allocated to each carrier (g1, g2, . . . gn) are variables in such a system.

The receiver 16 demodulates the received signal (may be after cyclic prefix removal and/or equalization) in a demodulator 30 to decode the transmitted constellation point. The demodulator 30 is connected to inverse scalers 32 to account for the gains applied by the transmitter. A constellation decoder 34 on the receiver side converts these constellation points in bits of length b1, b2, . . . bn. A parallel to serial converter 36 converts these bits to a single received bit stream 40.

The bit and power allocation algorithm uses the estimated signal to noise ratio in carriers of interest as its input. For a carrier to carry M bits at a target bit error rate Bber, an SNR of S is required. S depends on the noise characteristics and the constellation size. M could be integral or fractional. S can be computed for different values of M for a given bit error rate.

An initial conservative bit allocation is made such that the SNRs obtained permit integral number of bits at bit error rates equal to or lower than the target bit error rate $B_{ber}$. The available SNRs are actually higher than that is required, since some of the carriers are operating at lower bit error rates than required. Hence one can compute the SNR margins (extra SNR) present for transmitting at a bit error rate $B_{ber}$ in each carrier. The SNRs can be increased or decreased by correspondingly increasing or decreasing the transmission power since noise power is known. The sum of SNR margins available is a direct indication of the excess power available. The excess power is distributed across various carriers to increase the net bit rate. The distribution is on a priority basis. The carrier that requires the smallest increase in power (SNR) to jump from M bits to M+1 bits gets the highest preference. The priority is in that order for other carriers.

The power allocation is continued until the excess power gets exhausted or none of the carriers can increase the bit rate without violating power constraints. The net bit rate can be further increased if there are constraints on the minimum bit allocation per carrier. The algorithms checks if it is possible to decrease x bits in some carrier and get k (>x) bits in some other carrier which originally had no allocation by redistributing the power.

In determining power allocation to each carrier, the allocation may be subject to one or more of the following constraints:

Maximum power in any carrier 'i' does not exceed $P_{max}[i]$.
Minimum power in any carrier 'i' that carries non-zero bits does not fall below $P_{min}[i]$.
Each carrier carries a minimum of $B_{min}$ and maximum of $B_{max}$ bits.
The total power remains less than or equal to $P_0$ ($P_0$ may be a function of n, where n is number of bit carrying carriers. As an illustration $P_0$ could be P*n, where P is the nominal value of power in each carrier, see for example ANSI T1.413-1995, American National Standard for Telecommunications—Network and Customer Installation Interfaces—Asymmetric Digital Subscriber Line (ADSL) Metallic Interface, August 1995).

Figure 2:
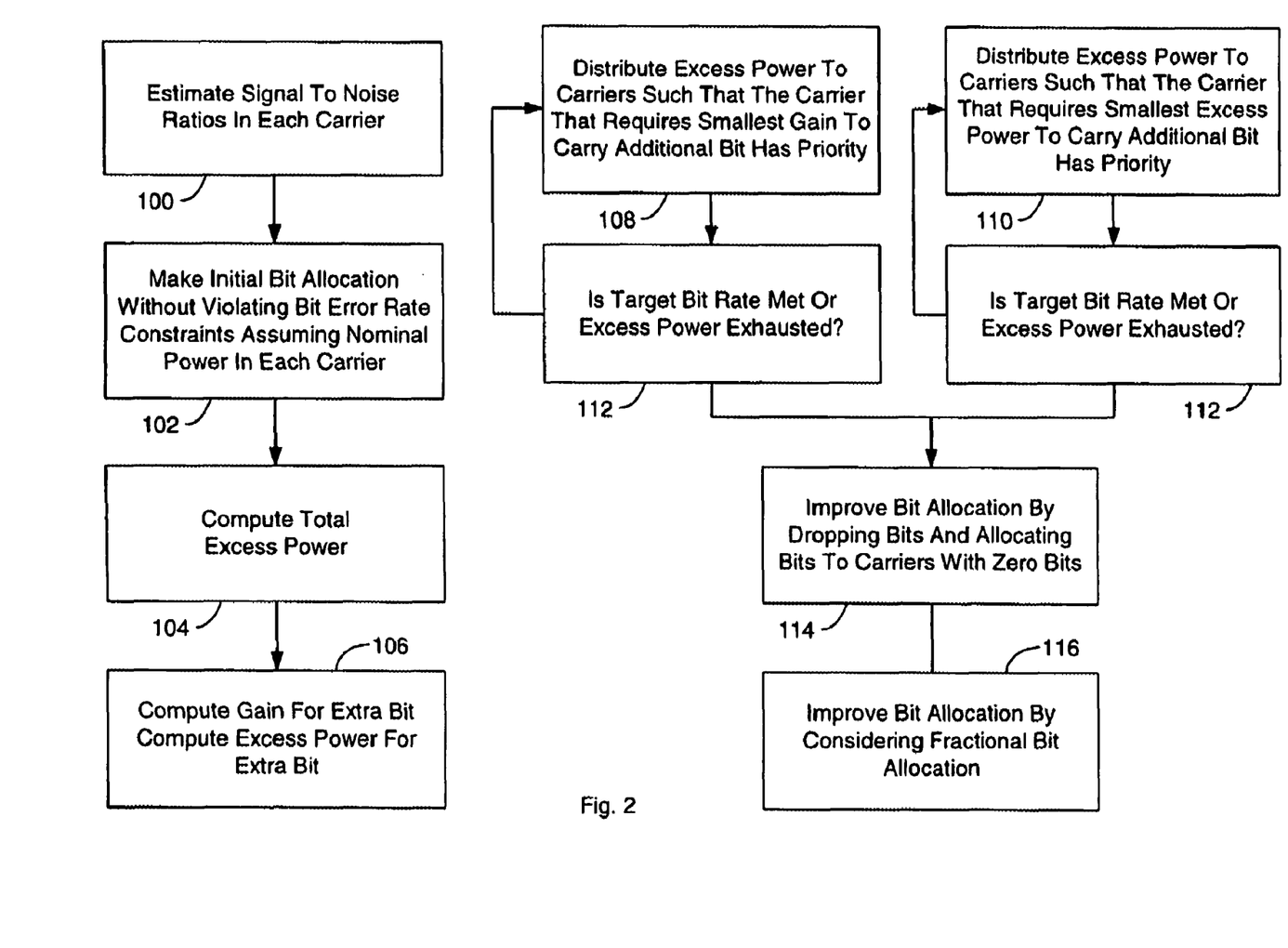
FIG. 2 is a flow chart illustrating examples of one aspect of the present invention.

FIG. 2 is a flow chart illustrating two examples of the present invention in more detail. Estimating the SNR (signal to noise ratio) SNR[i], with the nominal power or a known power P[i] being transmitted on each carrier i is step 100. The SNR computed is such that, given a constellation it can be directly used to compute the bit error rate. The effective SNR will depend on the estimated noise characteristics. Allocating bits[i] to each carrier i so that with the given SNR, the bit error rate is less than or equal to the target bit error rate $B_{ber}$ is step 102. The bit allocation is done subject to the constraint that bits[i] lies in the set $\{B_{max}, B_{max}-1 \ldots B_{min}, 0\}$. Carriers i with SNR[i] less than the SNR required for $B_{min}$ bits do not carry any bits.

Computing total excess power is step 104. First, the actual signal to noise ratio $SNR_{req}[i]$ required for allocating bits[i] in carrier i with a bit error rate $B_{ber}$ for all carriers with non zero bit allocation is computed. The reduced transmit power Px[i] in each carrier required to achieve $SNR_{req}[i]$ is also calculated. This is done with a constraint on the minimum power $P_{min}[i]$. The required transmit power in carrier i is given by: $Px[i]=(SNR_{req}[i]SNR[i])*P[i]$. If Px[i] is less than $P_{min}[i]$ then, $SNR_{req}[i]$ is set to $(P_{min}[i]/P[i])*SNR[i]$ and Px[i] is set to $P_{min}[i]$. $SNR_{req}[i]$ and Px[i] are set to SNR[i] and P[i] for those carriers i having no initial bit allocation. Then, the total excess power $P_{recess}$, available for transmission with the current bit allocation is computed. The total excess power is the sum of excess power in all carriers carrying data bits. The excess power obtained from each carrier is computed as: $P[i]-Px[i]=P[i]*(1-(SNR_{req}[i]/SNR[i]))$.

Computing gains and excess power required by each carrier to carry extra bits is step 106. For all carriers i having bits allocated in the range $\{B_{max}-1, \ldots B_{min}\}$, gains[$i$]=($SNR$ required for transmitting (bits[$i$]+1))/($SNR_{req}[i]$)

excess_power[$i$]=(gains[$i$]−1)*Px[$i$]

For carriers carrying no bits, gains[$i$]=($SNR$ required for transmitting $B_{min}$)/($SNR[i]$)

excess_power[$i$]=(gains[$i$]−1)*Px[$i$]).

Allocating the excess power $P_{excess}$ available to the carriers, so as to increase the bits[i] carried by the carrier i is the next step. In a first strategy, step 108, the allocation is done in such a way that the carrier that needs the smallest gain gets its power allocated first. This is done subject to the constraint that gains[i]*Px[i]<=$P_{max}[$ ]. In a second strategy, step 110, the allocation is done in such a way that the carrier that needs the smallest excess_power[ ] gets its power allocated first. This is done subject to the constraint that excess_power[i]+Px[i]<=$P_{max}[i]$.

For both the first and second strategies allocating power in carrier i, updating the number of bits, SNR required, excess power available and the transmit power required for that carrier is step 112. An example of updating is as follows.
if (bits[i]==0), then
  bits[i]=$B_{min}$,
else
  bits[i]=bits[i]+1
end if
$SNR_{req}[i]$=gain[i]*$SNR_{req}[i]$ $P_{excess} = P_{excess} - Px[i]*(gains[i]-1)$
$Px[i] = Px[i]*gains[i]$ To speed up this step depending on the strategy either gain[ ] or excess_power[ ] array could be sorted from least to greatest and a single pass bit allocation can be done. An advantage of Strategy 1 over Strategy 2 is that the gains[ ] array can be sorted in O(N) time since the gains[ ] take only a finite number of values for carriers that have non zero bit allocation. However, Strategy 2 gives improved bit allocation as compared to Strategy 1 and takes O(N*log(N)) time.

Depending on which strategy is used, the steps of computing gains and excess power and allocating excess power may be repeated until no further refinement in allocation is possible or there is no excess power left. The process may also be terminated at any time if required bit rate is met or if processing time is limited.

Determining whether an improved bit allocation may be achieved is step 114. If $B_{min} > 1$ then removal of x bits (x in the range $\{1, \ldots B_{min}-1\}$) on some carrier j along with $P_{excess}$ left may yield an allocation of $B_{min}$ bits in the carrier i which had no initial allocation. This is done by reducing the power and bit allocation on carrier j which has bits[j]>$B_{min}$ bits and allocating the combined excess power to the carrier i which has bits[i]=0, subject to constraints on maximum and minimum power. Optimum values of x and j are obtained through a search. This step is repeated till there is no such carrier i satisfying constraints or until an allocated processing time expires. $P_{excess}$, Px[i] and Px[j] are updated for such carriers i and j. The power Px[i] and bits[i] contain the power and bits allocated to each carrier i. This completes integral bit allocation.

Allocating fractional bits by finding the set of carriers which can together $B_{min}$ bits at a target bit error rate $B_{ber}$ is step 116. The set with smallest cardinality and least power requirements that meets the constraints is allocated first. $P_{excess}$ is updated after each allocation. This step is repeated till no further allocation can be done without violating the constraints or if processing time is limited. Power allocation for fractional bit carriers may be performed as set forth above for integral bits.

Fractional bit allocation may be performed to increase the data rate. In this step, two carriers that can carry data by transmitting the same symbol are allocated first, then three carriers that can carry data by transmitting the same symbol are allocated next and so on. In other words, the set with the smallest cardinality is given the priority. If there is more than 1 such set, then the set with lesser power requirement is given the priority. The excess power available from any allocation is accumulated for use in subsequent allocations subject to constraints. The allocation is constrained by maximum and minimum power per carrier, and the maximum number of carriers that can be used for transmitting the same symbol.

The gains[ ] are communicated by the receiver to the transmitter. These gain values are applied to each carrier thereby increasing or decreasing the transmission power in that carrier. In the discussion so far we assumed that gains[ ] are real numbers. The effective SNR[i] at the receiver can be improved if the gains[ ] take a form $r*e^{(-j\Theta[i])}$ (complex gain) to take care of skew in the noise distribution. If the noise measured in each carrier has unequal components in x and y directions (QAM) then the gains[ ] array can have two real components (one for x axis and the other for y axis) to ensure same bit error rate on x and y directions. The effective SNR may be increased by an order of 3 dB using complex/unequal (x,y) gains. This, however, depends on the noise characteristics. For example, Bud noise that occurs due to AM interference has elliptical noise distribution. These enhancements in SNR may be used to increase the net bit rate.

Figure 3:
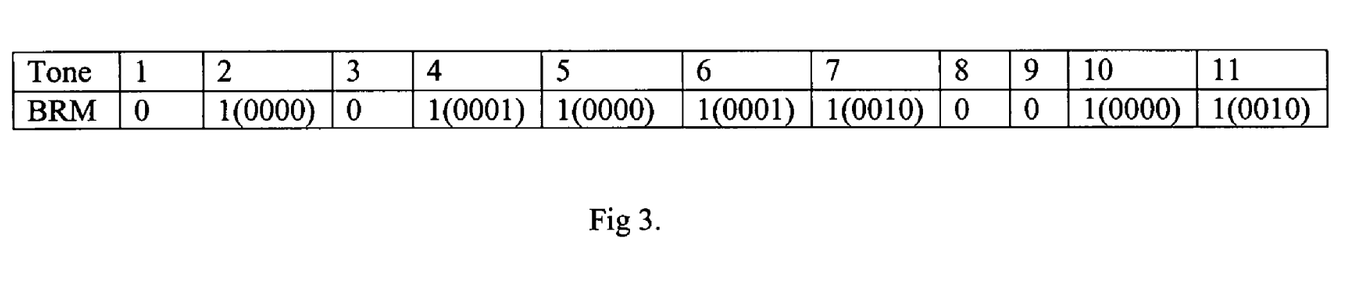
FIG. 3 is a table illustrating an example of a protocol for conveying fractional bit allocation according to one aspect of the present invention.

A receiver may convey fractional bit allocation to the transmitter. The protocols for conveying fractional bit allocation are also referred to as Bit Repetition Messages (BRM). A first BRM protocol is illustrated in FIG. 3. The BRM in FIG. 3 consists of an n bit pattern for each carrier. The n bit pattern is used as an identifier, and all carriers having the same identifier carry the same symbol. The bit field width n directly controls the maximum number of symbols (maximum of $2^n-1$ identifiers are possible) transmitted using fractional bit allocation, which is desirable for controlling the Peak-to-Average Ratio of the signal.

Carriers 1, 3, 8 and 9 do not carry information repeated on any other carrier. The identifier field for 2, 5 and 10 are the same, conveying that they carry the same data. Similarly, 4 and 6 as well as 7 and 11 form the other parallel data carrying sets.

Figure 4:
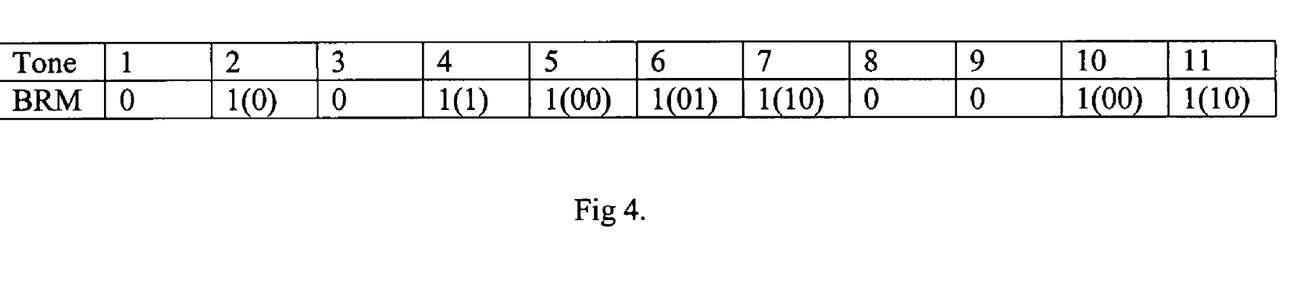
FIG. 4 is a table illustrating another example of a protocol for conveying fractional bit allocation according to one aspect of the present invention.

A second BRM protocol is illustrated in FIG. 4. This protocol is similar to the first protocol except that the identifier field has a variable length designed to reduce the length of the message. It starts with a value zero represented in a single bit and is incremented whenever a new identifier is required. The field width of the identifier is dependent on the current maximum value of the identifier. If all possible combinations that can be represented by the current number of bits for the identifier are exhausted, the identifier field width is increased by 1 bit. All carriers with the same value of the identifier carry the same data.

Figure 5:
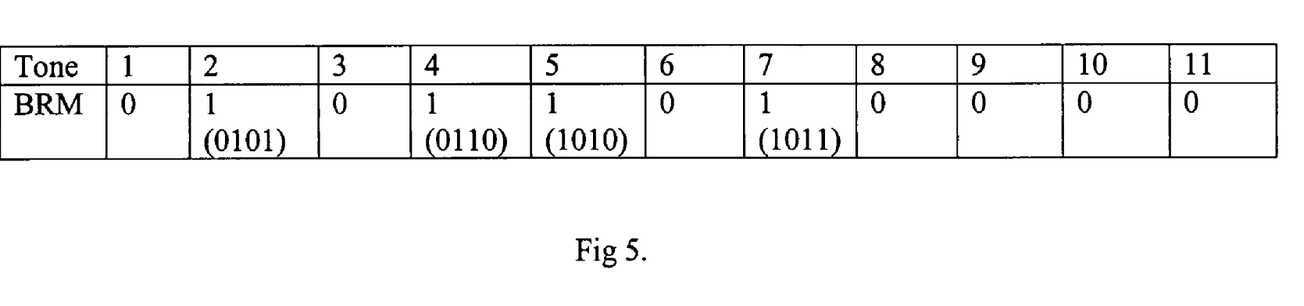
FIG. 5 is a table illustrating another example of a protocol for conveying fractional bit allocation according to one aspect of the present invention.

A third BRM protocol is illustrated in FIG. 5. In this protocol the BRM consists of a $\log_2(k)$ length bit pattern per carrier, where k is the total number of carriers. For each carrier the bit pattern indicates the index of the next carrier that carries the same symbol. If no such carrier exists then the bit pattern for 0 is used.

The BRM in protocol 1 and 2 can be modified such that if an identifier appears more than 'm' times then (m+1)th instance and onwards is considered as a different identifier (i.e. a carrier set carrying a different bit). This will allow the protocol to control the number of carriers that can carry same symbol.

Figure 6:
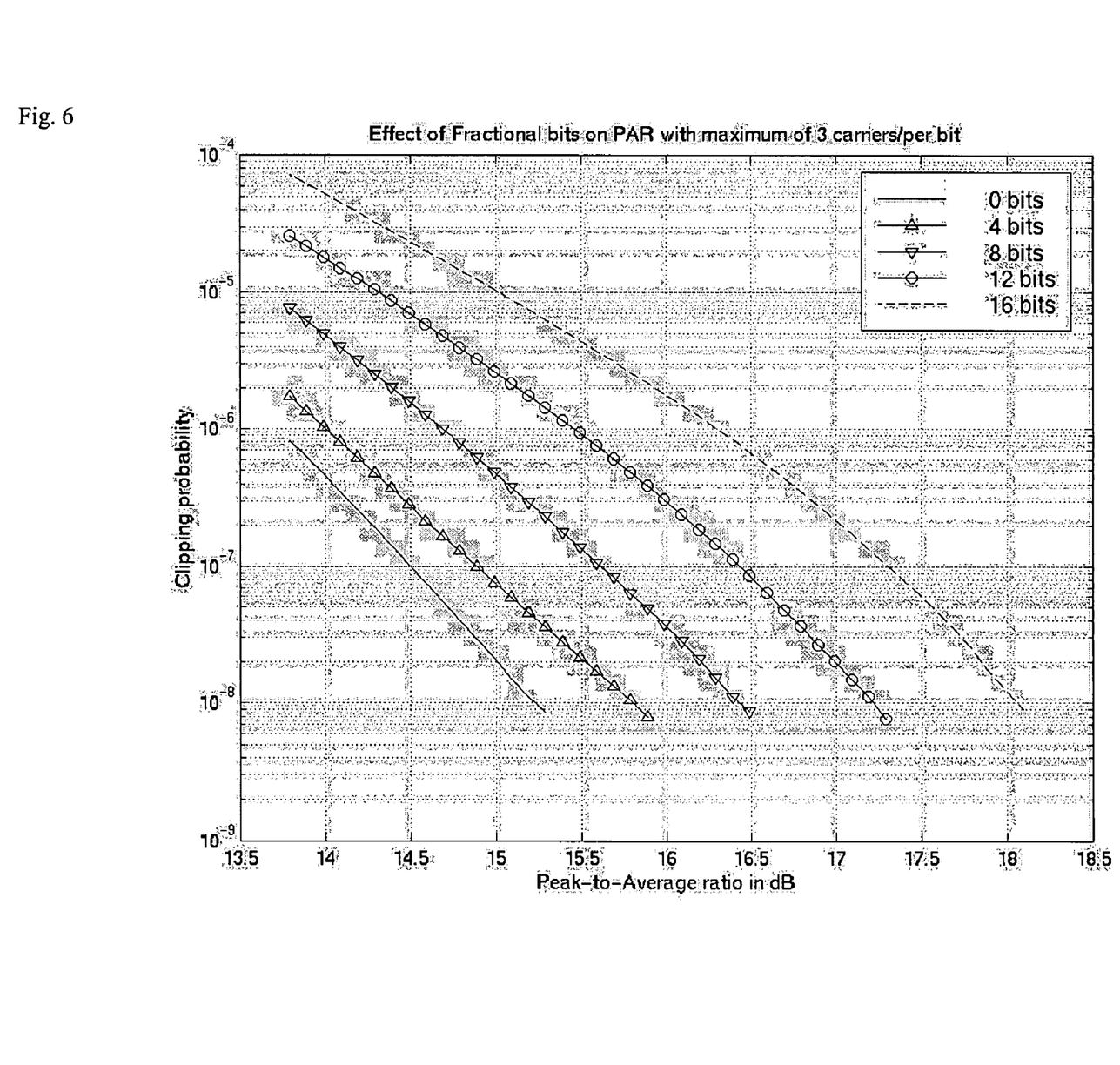
FIG. 6 is a graph illustrating effects of fractional bits on PAR.

The Peak to average ratio of the signal gets affected when many carriers carry the same symbol (as in the case of fractional bit allocation). Studies show that up to 2.7 dB increase in PAR occurs with 3 carriers carrying the same symbol (on a 2-bit constellation) and when up to 16 such sets are present in a 128-carrrier system. See FIG. 6.

Figure 7:
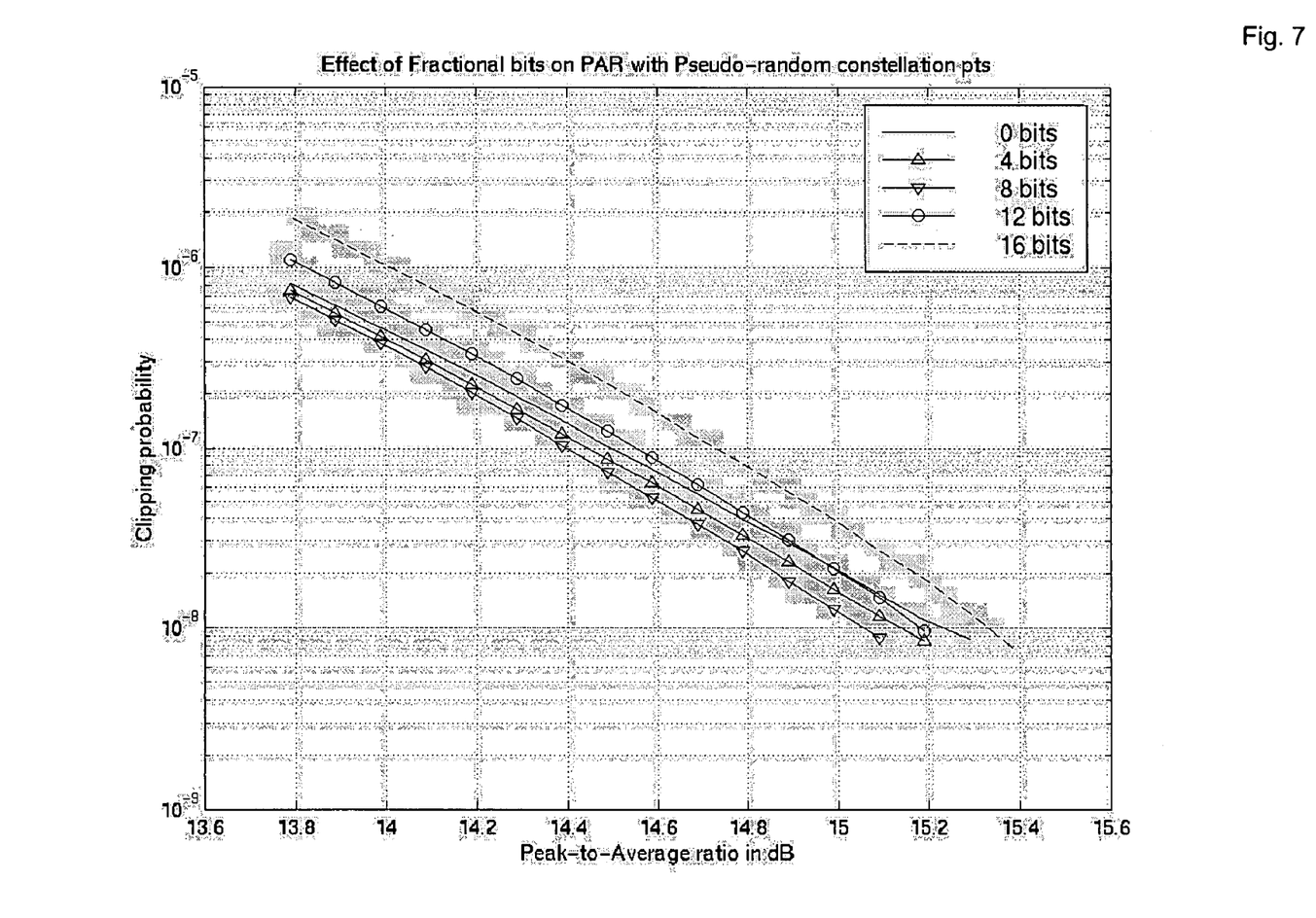
FIG. 7 is a graph illustrating effects of fractional bits on PAR with pseudo-random constellation points according to one aspect of the present invention.

By giving a pseudo-random phase offset in multiples of 45 degrees to the carriers carrying same symbol, the increase in PAR reduces to less than 0.2 dB for the same system. See FIG. 7. The phase offset is constant across symbol periods. This phase offset can be absorbed in the complex gain sent to the transmitter, which is applied to every carrier. A pseudo random bit pattern could be used to determine the pseudo random phase offsets. Depending on the constellation size 'k' bits of the pseudo random bits may be used.

As an illustration, consider a multi-carrier system. If the system uses 1 bit constellation for transmitting fractional bits then, bit 0 can map to a pseudo-random symbol in that carrier and bit 1 can map to the same symbol rotated by 180 degrees in that carrier. If the pseudo-random sequence is known to both the transmitter and the receiver then the receiver can decode that symbol as a 1 or a 0.

While various embodiments of the invention have been described, it will be apparent to those of ordinary skill in the art that many more embodiments and implementations are possible and are within the scope of the invention. Accordingly, the invention is not to be restricted except in light of the attached claims and their equivalents.

What is claimed is:

1. A method of transmitting a data bit stream on a transmission system, the transmission system having a plurality of carriers and a target bit error rate, each carrier initially having a known transmit power, comprising the steps of:
   a. estimating a signal to noise ratio for each carrier for the known transmit power for each carrier;
   b. allocating a quantity of bits for each carrier so that a bit error rate is less than or equal to the target bit error rate for the estimated signal to noise ratio, wherein the quantity of bits is a whole number greater than or equal to zero;
   c. computing total excess power available for a current allocation of bits;
   d. computing gains required by each carrier to carry additional bits;
   e. allocating at least a portion of the total excess power to at least one carrier on the basis of the computed gains required by each carrier to carry additional bits;
   f. converting the data bit stream into a plurality of parallel bit streams based on the allocation of the total excess power;
   g. encoding the parallel bit streams;
   h. scaling the encoded parallel bit streams with a gain based on the allocation of the total excess power; and
   i. modulating the encoded and scaled parallel bit streams for transmission.

2. The method of claim 1, wherein the step of allocating at least a portion of the total excess power further comprises sorting the plurality of carriers from least to greatest computed gain to carry additional bits and allocating the total excess power based on the sorted order of the plurality of carriers.

3. The method of claim 1, further comprising repeating the steps of computing total excess power available for a current allocation of bits; computing gains required by each carrier to carry additional bits; and allocating at least a portion of the total excess power to at least one carrier on the basis of the computed gains required by each carrier to carry additional bits.

4. The method of claim 3, wherein the repeating of the steps is terminated when a target bit rate is achieved.

5. The method of claim 3, wherein the repeating of the steps is terminated upon the expiration of an allocated processing time.

6. The method of claim 1, wherein the step of computing total excess power further comprises the steps of:
   a. computing a signal to noise ratio required for achieving the target bit error rate for the currently allocated quantity of bits for all carriers having a non zero bit allocation;
   b. calculating a reduced transmit power for each carrier having a non zero bit allocation required to achieve the computed signal to noise ratio;
   c. calculating an excess power for each carrier where the reduced transmit power is calculated, the excess power being based on the difference between the transmit power and the calculated reduced transmit power for the carrier; and
   d. summing the excess power for all carriers carrying data bits.

7. The method of claim 6, wherein the step of calculating the reduced transmit power is subject to a minimum power constraint for each carrier.

8. The method of claim 6, wherein the step of calculating a reduced transmit power in a carrier is calculated based on a ratio of the computed signal to noise ratio to the estimated signal to noise ratio.

9. The method of claim 1, further comprising the step of reallocating one or more bits from a first carrier having a quantity of bits greater than zero to a second carrier having an initial allocation of zero bits.

10. The method of claim 1, wherein the step of computing gains required by each carrier to carry additional bits further comprises computing excess power required by each carrier to carry additional bits.

11. The method of claim 1, further comprising allocating fractional bits to a set of carriers having a smallest cardinality out of the plurality of carriers.

12. The method of claim 11 wherein the step of allocating fractional bits to a set of carriers out of the plurality of carriers having the smallest cardinality further comprises allocating fractional bits to a set of carriers having a lesser power requirement.

13. The method of claim 1, wherein the step of scaling the encoded parallel bit streams further comprises scaling with complex gains.

14. The method of claim 1, wherein the encoded parallel bit streams comprise QAM symbols, and wherein the step of scaling the QAM symbols comprises scaling with gains that are unequal in the X and Y axes.

15. A method of transmitting a data bit stream on a transmission system, the transmission system having a plurality of carriers and a target bit error rate, each carrier initially having a known transmit power, comprising the steps of:
   a. estimating a signal to noise ratio for each carrier for the known transmit power for each carrier;
   b. allocating a quantity of bits for each carrier so that a bit error rate is less than or equal to the target bit error rate for the estimated signal to noise ratio, wherein the quantity of bits is a whole number greater than or equal to zero;
   c. computing total excess power available for a current allocation of bits;
   d. computing excess power required by each carrier to carry additional bits;
   e. allocating at least a portion of the total excess power to at least one carrier on the basis of the computed excess power required by each carrier to carry additional bits;
   f. converting the data bit stream into a plurality of parallel bit streams based on the allocation of the total excess power;
   g. encoding the parallel bit streams;
   h. scaling the encoded parallel bit streams with a gain based on the allocation of the total excess power; and
   i. modulating the encoded and scaled parallel bit streams for transmission.

16. The method of claim 15 wherein the step of allocating at least a portion of the total excess power further comprises sorting the plurality of carriers from least to greatest computed excess power to carry additional bits and allocating the total excess power based on the sorted order of the plurality of carriers.

17. The method of claim 15, further comprising repeating the steps of computing total excess power available for a current allocation of bits; computing excess power required by each carrier to carry additional bits; and allocating at least a portion of the total excess power to at least one carrier on the basis of the computed excess power required by each carrier to carry additional bits.

18. The method of claim 17, wherein the repeating of the steps is terminated when a target bit rate is achieved.

19. The method of claim 17, wherein the repeating of the steps is terminated upon the expiration of an allocated processing time.

20. The method of claim 15, wherein the step of computing total excess power further comprises the steps of:
   a. computing a signal to noise ratio required for achieving the target bit error rate for the currently allocated quantity of bits for all carriers having a non zero bit allocation;
   b. calculating a reduced transmit power for each carrier having a non zero bit allocation required to achieve the computed signal to noise ratio;
   c. calculating an excess power for each carrier where the reduced transmit power is calculated, the excess power being based on the difference between the transmit power and the calculated reduced transmit power for the carrier; and
   d. summing the excess power for each carrier in all carriers carrying data bits.

21. The method of claim 20, wherein the step of calculating the reduced transmit power is subject to a minimum power constraint for each carrier.

22. The method of claim 20, wherein the step of calculating a reduced transmit power in a carrier is calculated based on a ratio of the computed signal to noise ratio to the estimated signal to noise ratio.

23. The method of claim 20, further comprising the step of reallocating one or more bits from a first carrier having a quantity of bits to a second carrier having an initial allocation of zero bits.

24. The method of claim 15, further comprising allocating fractional bits to a set of carriers having a smallest cardinality out of the plurality of carriers.

25. The method of claim 24, wherein the step of allocating fractional bits to a set of carriers out of the plurality of carriers having the smallest cardinality further comprises allocating fractional bits to a set of carriers having a lesser power requirment.

26. The method of claim 15, wherein the step of scaling the encoded parallel bit steams further comprises scaling with complex gains.

27. The method of claim 15, wherein the encoded parallel bit streams comprise QAM symbols and wherein the step of scaling QAM symbols comprises scaling with gains that are unequal in the X and Y axes.

28. A transmission system having a plurality of carriers and a target bit error rate, each carrier initially having a nominal or known transmit power, comprising:
   a. means for converting a serial data stream into a plurality of parallel data streams, each parallel data stream having a bit rate;
   b. means for encoding the parallel data streams in a quadrature amplitude modulation points connected to the means for converting;
   c. means for scaling the encoded parallel data streams connected to the means for encoding;
   d. means for modulating the scaled encoded parallel data streams connected to the means for scaling;
   e. means for allocating the bit rate for each of the parallel data streams and for allocating power for the means for scaling, comprising:
      1. means for estimating a signal to noise ratio for each carrier for the transmit power for each carrier;
      2. means for allocating a quantity of bits for each carrier so that the bit error rate is less than or equal to the target bit error rate for the estimated signal to noise ratio, wherein the quantity of bits is a whole number greater than or equal to zero;
      3. means for computing total excess power available for a current allocation of bits;
      4. means for computing additional power required by each carrier to carry additional bits; and
      5. means for allocating at least a portion of the total excess power to at least one carrier in response to the means for computing total excess power and the means for computing additional power required by each carrier to carry additional bits;
   f. a channel connected to the means for modulating;
   g. means for demodulating, connected to the channel;
   h. means for applying inverse scaling connected to the means for demodulating;
   i. means for decoding quadrature amplitude modulation points connected to the means for inverse scaling; and
   j. means for converting a plurality of parallel data streams into a serial data stream connected to the means for decoding quadrature amplitude modulation points.

29. The transmission system of claim 28, wherein the means for computing additional power required by each carrier to carry additional bits further comprises means for computing gains required by each carrier to carry additional bits.

30. The transmission system of claim 29, wherein the means for allocating at least a portion of the total excess power further comprises means for allocating a portion of the total excess power to a first carrier having a smallest computed gain to carry additional bits and for allocating a portion of the total excess power to a second carrier having a second smallest computed gain to carry additional bits.

31. The transmission system of claim 28, wherein the means for allocating at least a portion of the total excess power further comprises means for allocating a portion of the total excess power to a first carrier having a smallest computed excess power to carry additional bits and for allocating a portion of the total excess power to a second carrier having a second smallest computed excess power to carry additional bits.

32. The transmission system of claim 28, wherein the means for computing total excess power further comprises:
   a. means for computing a signal to noise ratio required for achieving the target bit error rate for the currently allocated quantity of bits for all carriers having a non zero bit allocation;
   b. means for calculating a reduced transmit power for each carrier having a non zero bit allocation required to achieve the computed signal to noise ratio;
   c. means for calculating an excess power for each carrier where the reduced transmit power is calculated; and
   d. means for summing the excess power for each carrier in all carriers carrying data bits.

33. The transmission system of claim 28, further comprising means for reallocating one or more bits from a first earner having a quantity of bits to a second carrier having an initial allocation of zero bits.

34. The transmission system of claim 28, further comprising means for allocating fractional bits to a set of carriers having the smallest cardinality out of the plurality of carriers.

35. The transmission system of claim 34, wherein the means for allocating fractional bits to a set of carriers out of the plurality of carriers having the smallest cardinality further comprises means for allocating fractional bits to a set of carriers having a lesser power requirement.

36. The transmission system of claim 28, wherein the means for scaling comprises means for scaling with a complex gain.

37. The transmission system of claim 28, wherein the means for scaling comprises means for scaling with an x-axis gain and with a y-axis gain, wherein the x-axis gain is not equal to the y-axis gain.

38. The transmission system of claim 28, wherein the means for allocating the bit rate for each of the parallel data streams and for allocating power continue to allocate the bit rate for each of the parallel data streams and to allocate power until a target bit rate is achieved.

39. The transmission system of claim 28, wherein the means for allocating the bit rate for each of the parallel data streams and for allocating power continue to allocate the bit rate for each of the parallel data streams and to allocate power until a predetermined allocation of time expires.

* * * * *